United States Patent [19]
Mammano

[11] Patent Number: 5,359,276
[45] Date of Patent: Oct. 25, 1994

[54] AUTOMATIC GAIN SELECTION FOR HIGH POWER FACTOR

[75] Inventor: Robert A. Mammano, Costa Mesa, Calif.

[73] Assignee: Unitrode Corporation, Billerica, Mass.

[21] Appl. No.: 61,630

[22] Filed: May 12, 1993

[51] Int. Cl.[5] .............................................. G05F 1/70
[52] U.S. Cl. ......................................... 323/207; 323/222; 363/89
[58] Field of Search ............... 323/207, 210, 222, 259, 323/285; 363/16, 89

[56] References Cited

U.S. PATENT DOCUMENTS

| | | | |
|---|---|---|---|
| 4,347,474 | 8/1982 | Brooks et al. | 323/224 |
| 4,355,277 | 10/1982 | Davis et al. | 323/351 |
| 4,384,321 | 5/1983 | Rippel | 363/124 |
| 4,412,277 | 10/1983 | Mitchell | 363/81 |
| 4,437,146 | 3/1984 | Carpenter | 363/21 |
| 4,467,268 | 9/1984 | Chambers et al. | 323/222 |
| 4,536,700 | 8/1985 | Bello et al. | 323/285 |
| 4,540,892 | 9/1985 | Carvalho | 307/130 |
| 4,540,893 | 9/1985 | Bloomer | 307/248 |
| 4,542,330 | 9/1985 | Terbrack | 323/222 |
| 4,608,498 | 8/1986 | Falzarano et al. | 307/22 |
| 4,625,272 | 11/1986 | Okuyama et al. | 323/207 X |
| 4,677,366 | 6/1987 | Wilkinson et al. | 323/222 |
| 4,683,529 | 7/1987 | Bucher, II | 363/44 |
| 4,686,616 | 8/1987 | Williamson | 363/21 |
| 4,780,805 | 10/1988 | Chewuk et al. | 363/142 |
| 4,940,929 | 7/1990 | Williams | 323/222 |
| 4,985,821 | 1/1991 | Cohen | 363/95 |
| 5,001,623 | 3/1991 | Magid | 363/143 |
| 5,124,539 | 6/1992 | Krichever et al. | 235/472 |
| 5,124,566 | 6/1992 | Hu | 307/116 |
| 5,126,652 | 6/1992 | Carlin | 323/267 |

OTHER PUBLICATIONS

IEEE Transactions on Power Electronics, vol. PE-2, No. 4, "Active Power Factor Correction For Switching Power Supplies", by M. F. Schlecht, et al. Oct. 1987.

"Dynamic Power Factor Correction in Capacitor Input Off Line Converters", pp. B3-1-B3-6, by Derek Chambers, et al. undated.

"Dynamic Power-Factor Correction Cuts Switcher Input-Current Drain", pp. 119-123, by Derek Chambers, et al., EDN Feb. 20, 1980.

"Power Factor Correction in Off-Line Switchers", pp. 55-58, Citronic Products, Jun. 15, 1988, by Arnold Hagiwara.

Pioneer Magnetics Application Note, "Power Factor" dated Aug. 1986.

California Institute of Technology Power Electronics Group, EE 116-81, Pasadena, Calif., "Input-Current Shaped Ac-to-Dc Converters", Prepared for NASA Lewis Research Center under Grant No. NAG 3-615, May 1986, pp. 1-47.

"Power Factor Controller", from Micro Linear, 2092 Concourse Drive, San Jose, Calif. 95131, Nov. 1991, Preliminary ML4821, pp. 1-12.

"Sinusoidal Lein Current Rectification With A 100 kHz B-Sit Step-Up Converter", Ned Mohan, Tore M. Undeland, Ralph J. Ferraro, 1984 IEEE, pp. 92-98.

"Unity Power Factor Off Line Switching Power Supplies", Richard Keller, Gary Baker, ROLM Corporation, One River Oaks Place, San Jose, California, 1984, IEEE, pp. 332-339.

Design Features, "The LT1248 Power-Factor Corrector", Carl Nelson, *Linear Technology Magazine*, Jun. 1993, pp. 3-5, 13.

Products Catalog entitled "High-Power Factor Preregulator", Unitrode Integrated Circuits, 7 Continental Blvd. Merrimack, N.H. 03054, pp. 5-218 through 5-225.

Primary Examiner—Steven L. Stephan
Assistant Examiner—Y. Jessica Han
Attorney, Agent, or Firm—Weingarten, Schurgin, Gagnebin & Hayes

[57] ABSTRACT

A high power factor regulator circuit which includes a variable multiplier, permitting the high power factor regulator circuit to be used with a number of input line voltage levels. In one embodiment a comparator determines the multiplication or gain factor to be applied in a control loop by comparing the rectified AC input voltage to a predetermined threshold value.

10 Claims, 7 Drawing Sheets

AUTOMATIC GAIN SELECTION FOR HIGH POWER FACTOR

FIELD OF THE INVENTION

The invention relates to high power factor circuits and especially to high power factor regulator circuits for power supplies which are intended to be used with various input voltages.

BACKGROUND OF THE INVENTION

Off-line switching power supplies convert an alternating current (AC) supply voltage to a direct current (DC) output voltage. The power factor for such an off-line switching power supply is defined as the ratio of the actual input power (actual input voltage times actual input current) to the root-mean-square (RMS) input power (RMS input voltage times RMS input current). Although ideally the power factor for such a supply should be equal to one, in practice, the power factor is generally much less than one.

This decrease in power factor occurs because, although the actual input voltage varies sinusoidally, the actual input current does not. The actual input current is distorted relative to the actual input voltage. This distortion of the current from a sinusoidal waveform is due to the fact that the actual input current is drawn by the rectifier and the filter of the power supply as a series of current pulses which occur at the peak of the input voltage waveform. These current pulses cause the actual input power to be less than the RMS input power, and result in power factor values for such systems typically to range from 0.5 to 0.7.

Various methods have been developed to restore the power factor near unity. Referring to FIG. 1, one method known to the prior art utilizes a boost converter 30 controlled by a pulse width modulator (PWM) 40. Although the boost converter 30 is shown having an inductor 60 and a diode 62, other forms of boost conversion are contemplated. An input voltage sensing circuit 80 measures the input rectified AC line voltage ($V_{in}$) 50 and derives an signal ($V_{AC}$) 54 from it.

FIG. 1A depicts an embodiment of an input voltage sensing circuit 80 utilizing two resistors as a voltage divider to provide a voltage which varies as the line voltage. It is also possible to utilize a single resistor to produce a current which varies as the line voltage. Still other embodiments are possible.

Similarly, an output voltage sensing circuit 90 measures the output voltage ($V_o$) 56 to produce a signal ($V_{os}$) 58. FIG. 1B depicts an embodiment of an output voltage sensing circuit 90 utilizing two resistors as a voltage divider. Still other embodiments are possible. The signal ($V_{os}$) 58 is compared to a reference voltage ($V_{ref}$) 100 by an amplifier 110 and, an error signal ($V_e$) 112 is generated. This error signal ($V_e$) 112 is multiplied by the signal ($V_{AC}$) 54 of input voltage sensing circuit 80 to generate a multiplier signal ($V_m$) 114. A amplifier 130 compares this multiplier signal ($V_m$) 114 to a signal ($V_i$) derived from the input current ($I_{in}$) 118, as measured by a current sensor 140, and generates a control signal ($V_c$) 142.

FIG. 1C depicts an embodiment of a current sensor 140 which uses a resistor to produce the voltage drop ($V_i$) which is proportional to the current ($I_{in}$). Still other embodiments, such as those using a transformer, are also possible.

This control signal ($V_c$) 142 governs the operation of the PWM 40 in a manner well known to one skilled in the art, and hence controls the switching of the boost converter 30 through switch 144. This control loop is such that the instantaneous input current ($I_{in}$) 118 is forced to follow the multiplier signal ($V_m$) 114 which contains both the waveform and amplitude information necessary for good power factor control and voltage regulation.

The multiplier signal ($V_m$) 114 is governed by the equation:

$$V_m = k_2 * V_e * V_{AC},$$

where $k_2$ is a constant which includes all the linear gain terms in the control loop.

Since the input current ($I_{in}$) 118 is forced to follow the multiplier signal ($V_m$) 114, the input current ($I_{in}$) 118 is governed by the equation:

$$I_{in} = k_1 * V_m$$

where $k_1$ is a constant which includes all the terms from the boost converter 30, the pwm 40 and the amplifier 130.

Substituting the defining equation for $V_m$ into this equation yields the relationship:

$$I_{in} = k_1 * k_2 * V_e * V_{AC}.$$

This result means that the circuit described will meet the basic requirement of generating a sinusoidal input current (determined by the term $V_{AC}$) and a constant output voltage (determined by the term $V_e$).

However, the overall performance of this circuit will be less than optimum because, when the circuit is operated under the conditions of a constant load, the circuit should deliver constant power, regardless of changes the input voltage. Further, since there is minimal power lost within the boost converter itself, the average input power should also remain relatively constant.

The constraint of delivering constant power when under constant load, for any value of RMS input line voltage, means that the circuit should compensate for an increase in the RMS input line voltage with a corresponding reduction of RMS input current. However, since, as shown above, the input current is governed by expression:

$$I_{in} = k_1 * k_2 * V_e * V_{AC}$$

an increase in $V_{AC}$ 54, which is determined by the input RMS line voltage, will cause an increase in input current ($I_{in}$) 118, rather than a decrease, for constant values of $k_1$ and $k_2$. Additionally, with this increase in current, the average input power does not remain constant, but will increase as the square of the input voltage ($V_{in}$), unless it is corrected by a compensating change in the error term ($V_e$).

With sufficient gain in the voltage feedback loop, the error voltage ($V_e$) can be forced to correct for this change in line voltage ($V_{AC}$) although only at significant cost in dynamic performance. Additionally, the use of gain for line voltage correction causes both the maximum output power limit and the AC gain of the voltage feedback loop to vary as $V_{in}^2$, making the trade-off between good dynamic performance and low input current distortion impossible to achieve over a wide range of line voltages.

The ability to use the power supply over a wide range of line voltages, is an important consideration in the design of power supplies since the variation in RMS line voltages throughout the world is, for example, from about one hundred volts in Japan to about 240 volts in Great Britain. Thus the ability of a circuit to achieve high power factor in the presence of such a range of input line voltages would permit a single off-line power supply design to be used in all locations throughout the world.

Thus it would be desirable to provide a circuit which achieves high power factor over a wide range of input line voltages.

SUMMARY OF THE INVENTION

The invention relates to a high power factor circuit which includes a variable multiplier, permitting the high power factor circuit to be used with various input line voltages.

In one embodiment a comparator determines the multiplication or gain factor to be applied in a control loop by comparing the rectified AC input voltage to a predetermined threshold value.

In another embodiment a comparator determines the multiplication or gain factor to be applied to an error signal derived from the output voltage by comparing the rectified AC input voltage to a predetermined threshold value.

In yet another embodiment a comparator determines the multiplication or gain factor to be applied to a signal derived from the input voltage by comparing the rectified AC input voltage to a predetermined threshold value.

In still yet another embodiment a comparator determines the multiplication or gain factor to be applied to a control signal derived from the multiplication of an error signal by a signal derived from the input voltage by comparing the rectified AC input voltage to a predetermined threshold value.

BRIEF DESCRIPTION OF THE DRAWING

These and further features of the invention will be better understood with reference to the preferred embodiment and the drawing in which.

DESCRIPTION OF THE PREFERRED EMBODIMENT

Figure 1:
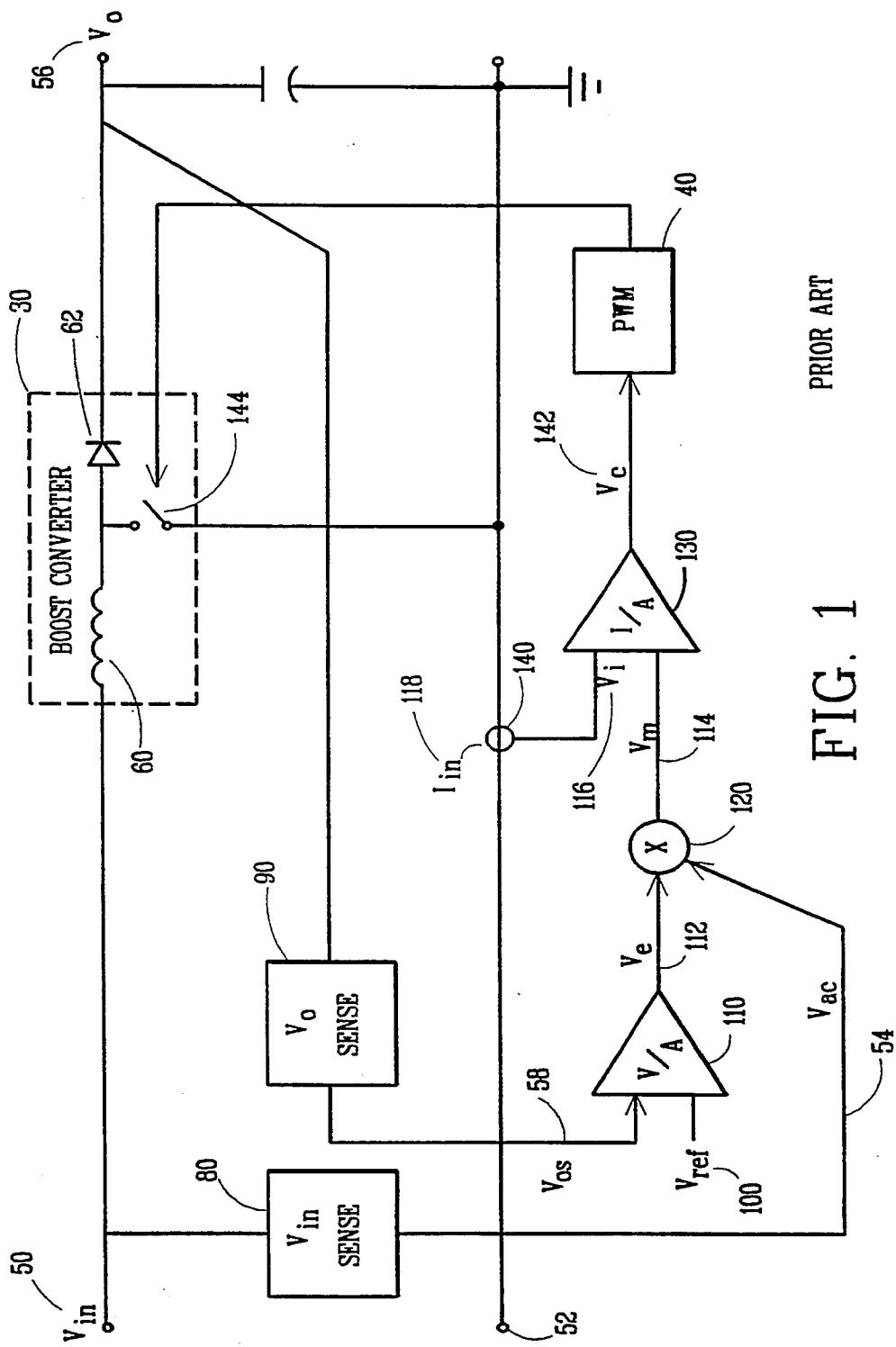
FIG. 1 is a schematic diagram of an embodiment of a high power factor circuit known to the prior art.
Figure 1A:
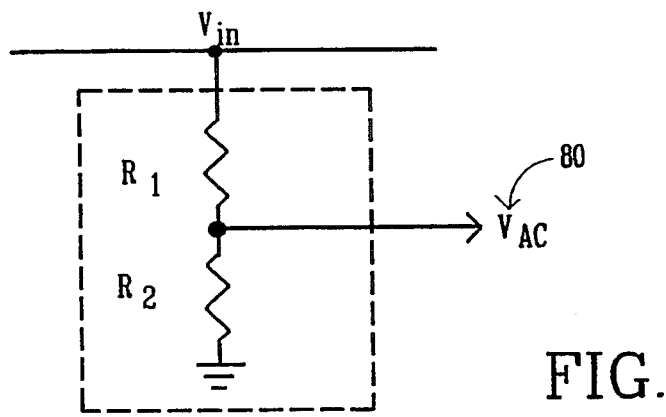
FIG. 1A is an embodiment of an input voltage sensing circuit.
Figure 1B:
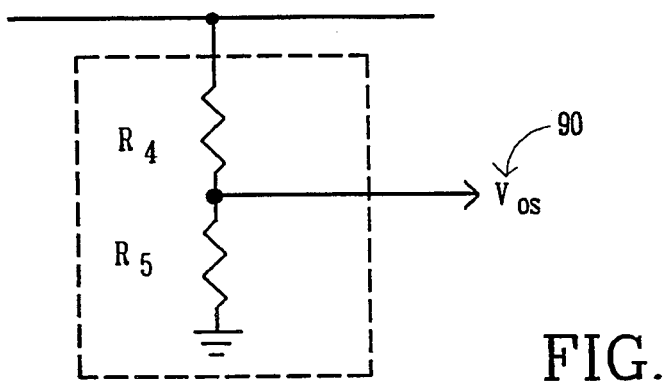
FIG. 1B is an embodiment of an output voltage sensing circuit.
Figure 1C:
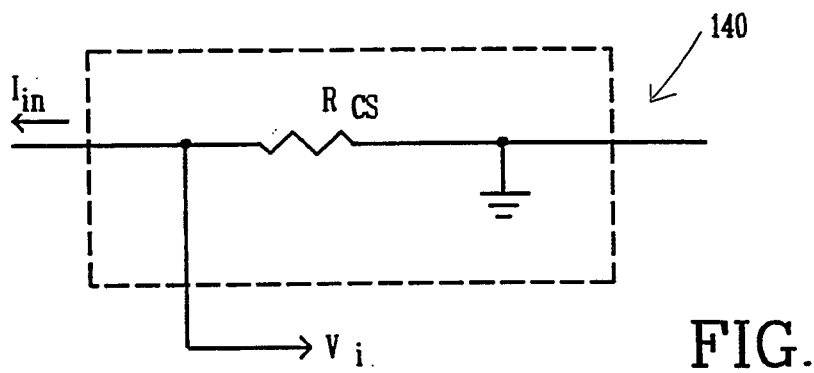
FIG. 1C is an embodiment of a current sensor.
Figure 2:
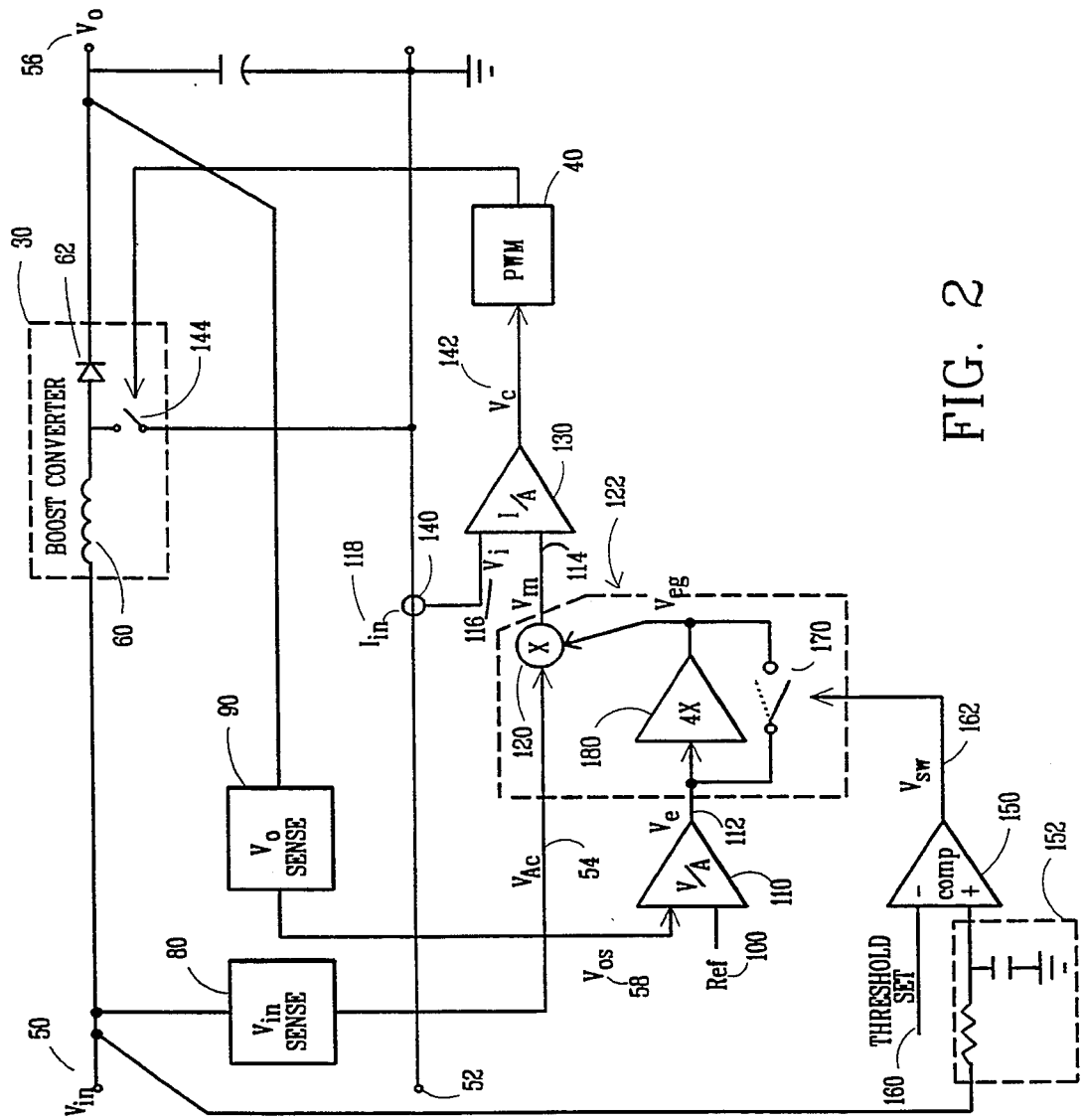
FIG. 2 is a schematic diagram of an embodiment of a high power factor circuit constructed in accordance with the invention.

As described above, although there is a great variation in line voltages from country to country, typical line voltages worldwide cluster within two relatively narrow ranges; 80–130 V and 200–265 V. Further, at any one location the line voltages typically are held to a tolerance of about ±15%. Therefore, a high power factor circuit which is usable in a large number of locations worldwide need not respond to dynamic input voltage changes of from 80–265 V, but need only be able to respond to relatively small changes in the RMS input voltage within either of these two ranges. An embodiment of such a high power factor circuit is depicted in FIG. 2. In brief overview, in this embodiment, a boost converter 30 provides an output voltage ($V_o$) 56 at an output terminal under the control of a PWM 40. The PWM 40 is in turn responsive to a control signal ($V_c$) 142 which is generated from the output voltage ($V_o$) 56, the input voltage ($V_{in}$) 50 and the input current ($I_{in}$) 118 as discussed previously.

However, in this embodiment, a comparator 150 compares a dc representation of the input voltage ($V_{in}$) 50 as generated through a filter 152 to a threshold value 160 and generates a switching signal ($V_{sw}$) 162 which is a function of whether the input voltage ($V_{in}$) 50 exceeds an arbitrarily assigned intermediate voltage value to which the threshold value 160 corresponds. It should be noted that in alternative embodiments filter 152 could be replaced by a peak detector or averaging circuit. The threshold value 160 is thus picked to represent an intermediate voltage value between the two ranges of interest. In one embodiment the threshold voltage is set to equate to a input voltage value ($V_{in}$) of substantially 170 V, a value intermediate between 80–130 V and 200–265 V, the two ranges of interest. Thus when the filtered input voltage exceeds the threshold value 160, the input voltage ($V_{in}$) 50 falls within the second range of line voltages. Conversely, when the input voltage ($V_{in}$) 50 is less than the threshold value 160, the input voltage ($V_{in}$) 50 falls within the first range of line voltages.

The switching signal ($V_{sw}$) 152 from the comparator 150 controls a switch 170 which is connected in parallel with an amplifier 180 having a gain, in this embodiment, of four. The gain of four is a result of the fact that the change in current is proportional to the square of the change in voltage. Thus to cover a range of voltage from 120 V to 240 V (a factor of two change in voltage), the current would need to change by a factor of four. Similarly, to cover a voltage range of 100 V to 300 V, a factor of three, the gain factor is nine. Thus the gain used is determined by the range of input voltages to be covered.

Amplifier 180, switch 170 and multiplier 120 constitute a multiplier circuit 122. In this embodiment the amplifier 180 and switch 170 are connected in series between amplifier 110 and multiplier 120. Thus, when the switch 170 is open, the error signal ($V_e$) 112 generated by amplifier 110 is multiplied by a gain of four by amplifier 180 prior to being multiplied by the signal ($V_{AC}$) 54 of input voltage sensing circuit 80. When the switch 170 is closed, the error signal ($V_e$) is shunted around the amplifier 180 and thereby fed directly to the multiplier 120.

Thus, because of the presence of the amplifier 180 and switch 170, the multiplier signal ($V_m$) is governed by the equations:

$$V_m = 4 * k_2 * V_e * V_{AC} \text{ for } V_{in} < \text{threshold value}$$

and $$V_m = k_2 * V_e * V_{AC} \text{ for } V_{in} > \text{threshold value.}$$

Again since the input current ($I_{in}$) 118 is forced to follow the multiplier signal ($V_m$), the input current ($I_{in}$) 118 is governed by the equation:

$$I_{in} = k_1 * V_m$$

Substituting the defining equations for ($V_m$) 114 into this equation yields:

$$I_{in} = 4 * k_1 * k_2 * V_e * V_{AC} \text{ for } V_{in} < \text{threshold value}$$

$$I_{in} = k_1 * k_2 * V_e * V_{AC} \text{ for } V_{in} > \text{threshold value.}$$

Figure 3:
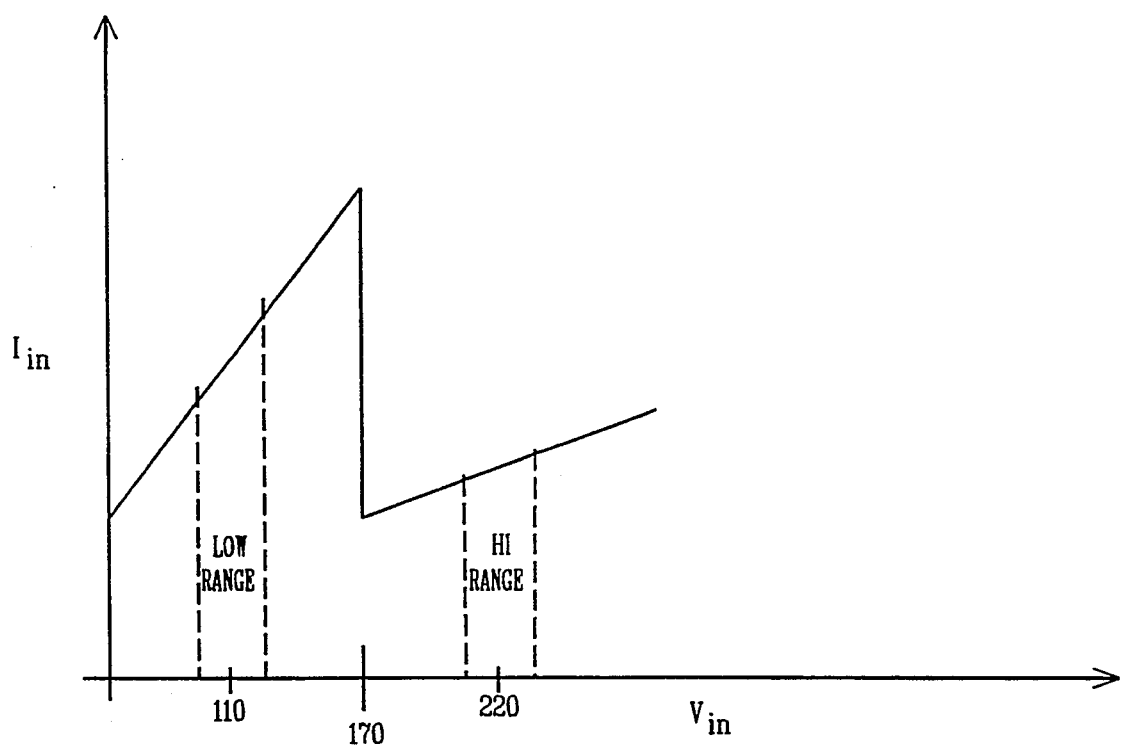
FIG. 3 is a graph of the input RMS current versus voltage characteristics of the embodiment of the invention shown in FIG. 2.

FIG. 3 depicts the input current versus the input voltage curve for these ranges.

Figure 4:
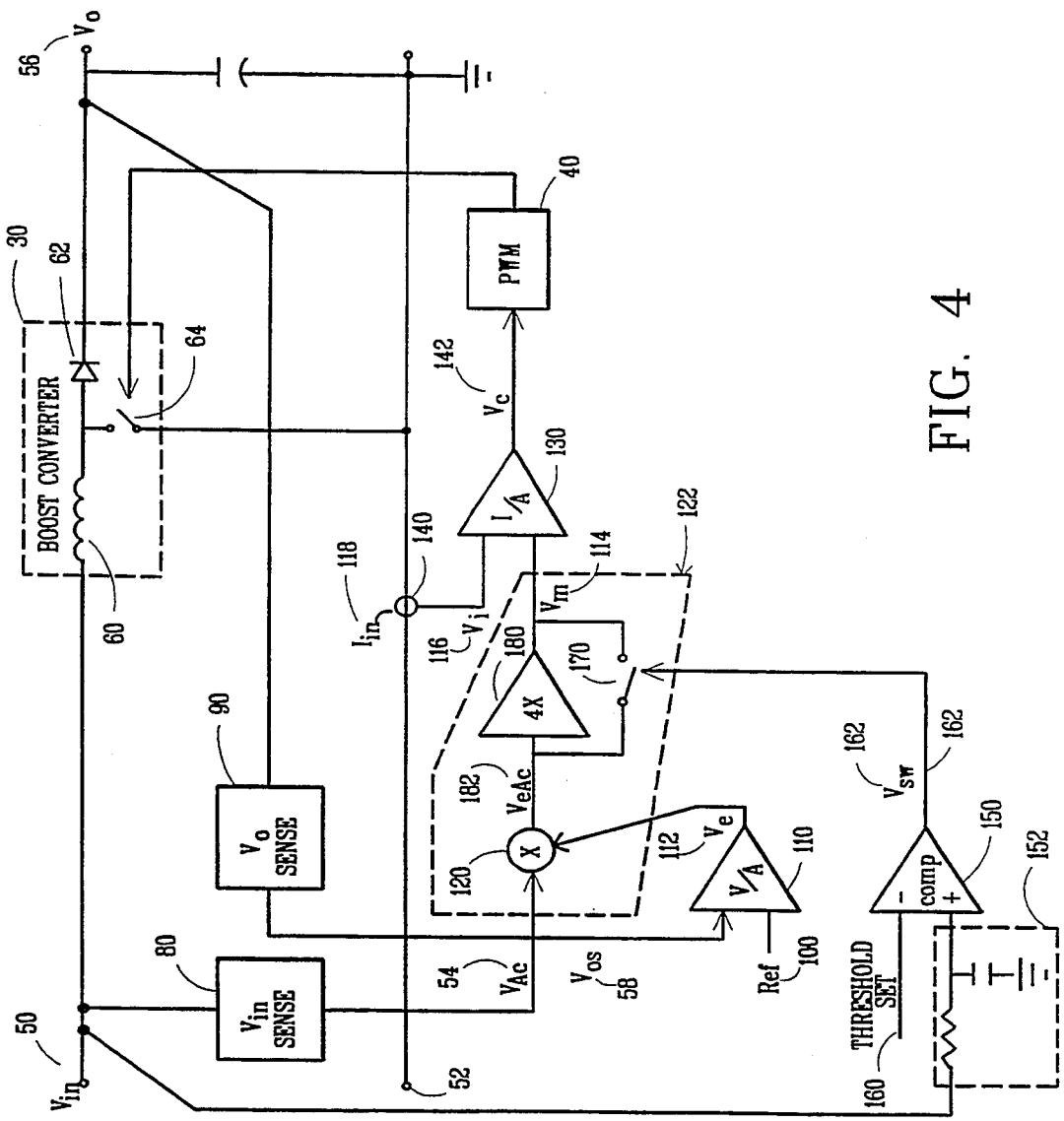
FIG. 4 is a schematic diagram of another embodiment of a high power factor circuit constructed in accordance with the invention.

Referring to FIG. 4, in another embodiment, a comparator 150 comparing the dc representation of the input voltage ($V_{in}$) 50 to an intermediate voltage value to which the threshold value 160 corresponds, generates a switching signal ($V_{sw}$) 162 as previously described. Also, as in the previous embodiment, the switching signal ($V_{sw}$) 162 from the comparator 150 controls a switch 170 connected in parallel with a amplifier 180. Again, in this embodiment amplifier 180, multiplier 120 and switch 170 constitute a multiplier circuit 122. However, in this embodiment, the amplifier 180 and the parallel switch 170 are connected in series between a multiplier 120 and a amplifier 130. In this embodiment, the signal ($V_{AC}$) 54 of a voltage sensing circuit 80 and the error signal ($V_e$) 54 from a amplifier 110 are multiplied together in multiplier 120 to generate a signal ($V_{eAc}$) 182 prior to being amplified by the amplifier 180. The result is the same as in the previous embodiment with the current ($I_{in}$) 118 being governed by the equations:

$$I_{in} = 4 * k_1 * k_2 * V_e * V_{AC} \text{ for } V_{in} < \text{threshold value}$$

$$I_{in} = k_1 * k_2 * V_e * V_{AC} \text{ for } V_{in} > \text{threshold value.}$$

Figure 5:
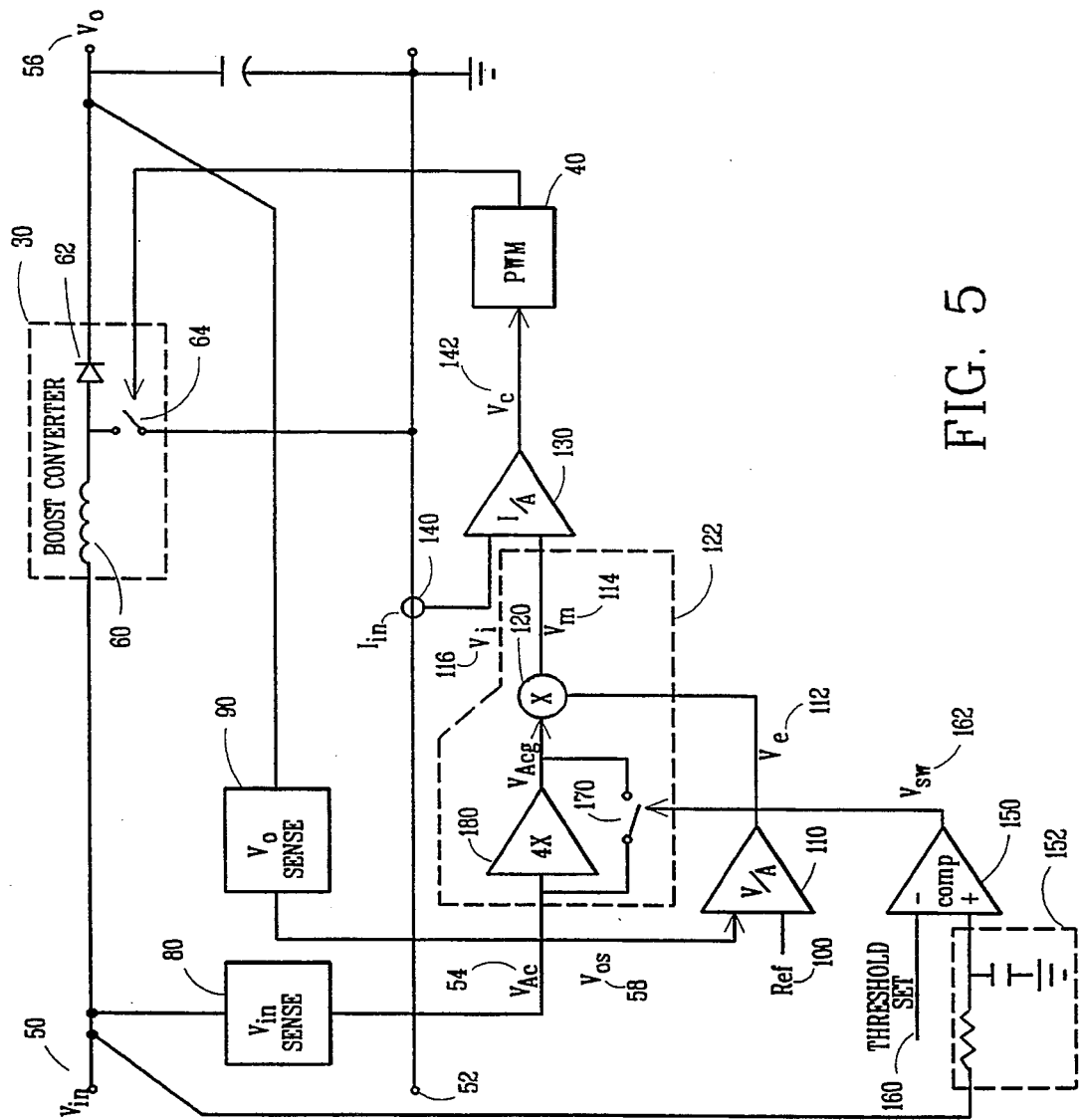
FIG. 5 is a schematic diagram of yet another embodiment of a high power factor circuit constructed in accordance with the invention.

Referring to FIG. 5, in yet another embodiment, a comparator 150 again compares the dc representation of the input voltage ($V_{in}$) 50 to an intermediate voltage value to which the threshold value 160 corresponds, to generate a switching signal ($V_{sw}$) 162. The signal ($V_{sw}$) 162 from the comparator 150 again controls a switch 170 connected in parallel with a amplifier 180. As before, in this embodiment amplifier 180, multiplier 120 and switch 170 constitute a multiplier circuit 122. In this embodiment however the amplifier 180 and parallel switch 170 are connected in series between a multiplier 120 and the output terminal of a voltage sensing circuit 80. Thus in this embodiment, the signal ($V_{AC}$) 54 of the voltage sensing circuit 80 is multiplied by a factor of four by amplifier 180 to generate signal ($V_{ACg}$) prior to being multiplied in multiplier 120 by the error signal ($V_e$) 112 of a amplifier 110 to generate the multiplier signal ($V_m$) 114. Again the result is the same as in the previously described embodiments with the current being governed by the equations:

$$I_{in} = 4 * k_1 * k_2 * V_e * V_{AC} \text{ for } V_{in} < \text{threshold value}$$

and $$I_{in} = k_1 * k_2 * V_e * V_{AC} \text{ for } V_{in} > \text{threshold value.}$$

Thus, in all these circuits, the error term ($V_e$) is reduced to a small enough value that it can be readily corrected regardless of input line voltage value. Further, these embodiments provide high power factor for a variable input voltage using only a comparator and a switchable fixed gain amplifier.

Figure 6:
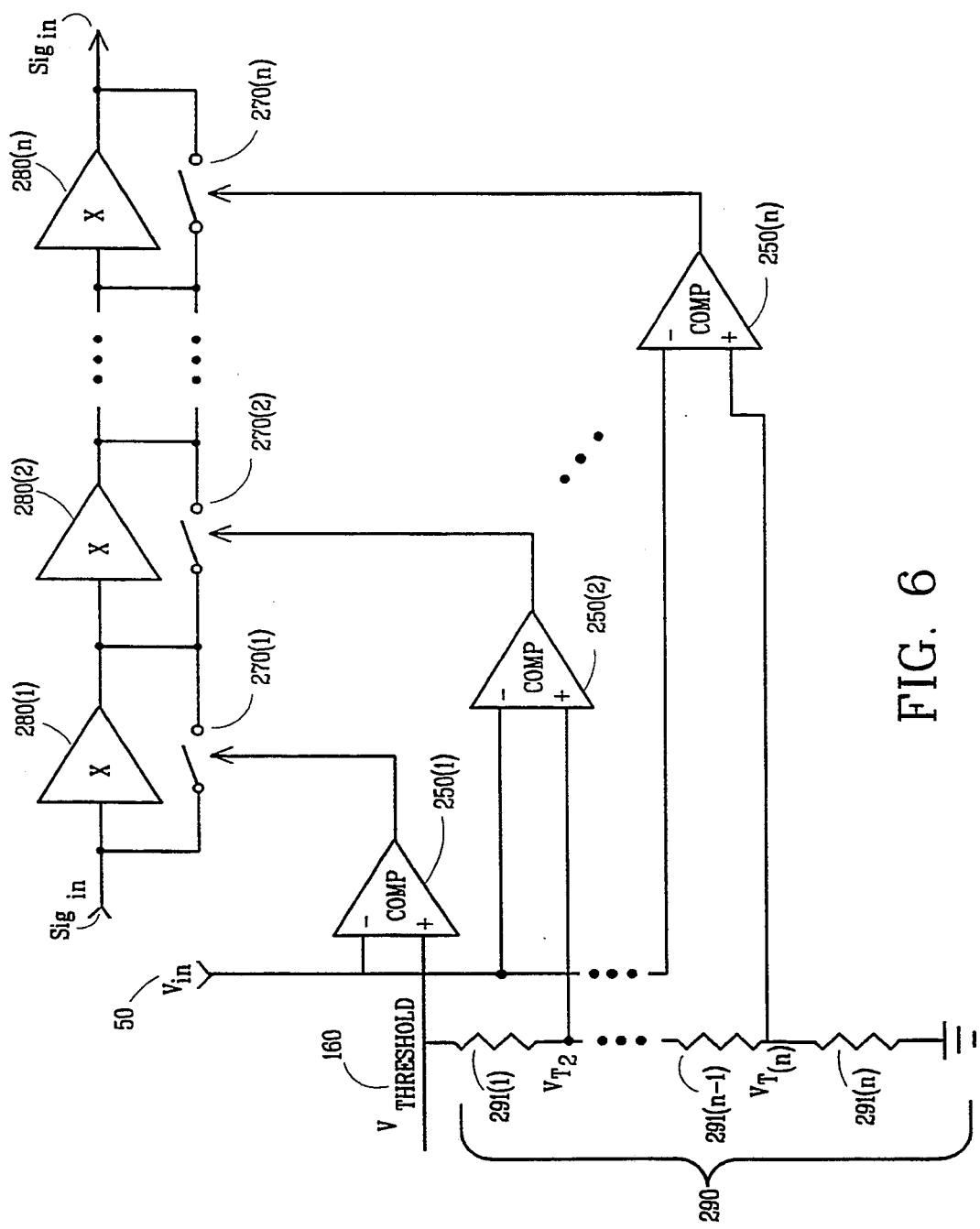
FIG. 6 is a schematic diagram of still yet another embodiment of a high power factor circuit constructed in accordance with the invention.

It is possible to provide for more than one threshold value and gain by increasing the number of amplifiers 180 and comparators 150. FIG. 6 depicts a schematic of an embodiment of the comparator-switch-multiplier portion of the invention in which multiple comparators (250(1) through 250(n)) control respective switches (270(1) through 270(n)) to permit amplifiers (280(1) through 280(n)) to provide up to (n) times the gain of one amplifier 280 responding to (n) threshold values. In this embodiment an input signal ($Sig_{in}$), which could be $V_{AC}$, $V_{eAC}$, or $V_e$ depending upon which of the previous embodiments of the invention is being used, is an input signal to the first of (n) amplifiers 280, connected in series. As before, each amplifier 280 is connected in parallel with a switch 270 controlled by a respective comparator 250. The input voltage ($V_{in}$) 50 is the input signal to one input terminal of each comparator 250. The second input of the first comparator 250(1) is the reference voltage threshold 160. The threshold voltage is also the input to a voltage divider 290 constructed of n resistors connected in series 291(1) through 291(n). The divided down voltages from the threshold voltage 160 ($V_{T(1)}$ through $V_{T(n)}$) provide the second input to comparators 250(2) through 250(n).

When the input voltage ($V_{in}$) is below the lowest threshold, all the switches 270 are open and the gain is (n) times. As the input voltage increases above the respective threshold voltage ($V_T$) of each comparator 250, the comparator 250 causes its respective switch 270 to close and to shunt its respective amplifier 280, reducing the gain. When the input voltage increases above the threshold voltage 160 all the switches 270 are closed and the gain is reduced to one. Thus (n) gains, corresponding to (n) thresholds can be generated. It should be noted that it is also possible to perform this function with a variable gain amplifier.

Having showed the preferred embodiments, those skilled in the art will realize many variations are possible which will still be within the spirit and scope of the claimed invention. Therefore, it is the intention to limit the invention only as indicated by the scope of the claims.

I claim:

1. A high power factor circuit having an input terminal and an output terminal, said high power factor circuit comprising:

a multiplier circuit having a first input terminal in electrical communication with said high power factor circuit input terminal, a second input terminal, a control terminal and an output terminal for providing a signal to control an output voltage at said high power factor circuit output terminal;

an output voltage amplifier having a first input terminal in electrical communication with said high power factor circuit output terminal, a second input terminal in communication with an output reference voltage and an output terminal in electrical communication with said multiplier circuit second input terminal, said output voltage amplifier providing a signal at said output voltage amplifier output terminal in response to comparing said output voltage at said high power factor circuit output terminal with said output reference voltage;

an input voltage comparator having a first input terminal in electrical communication with said high power factor circuit input terminal, a second input terminal in communication with an input reference voltage and an output terminal in electrical communication with said multiplier circuit control terminal, said input voltage comparator providing a signal at said input voltage comparator output terminal in response to comparing an input voltage at said high power factor circuit input terminal with said input reference voltage, said multiplier circuit providing one of at least two fixed gains in response to said signal applied to said multiplier circuit control terminal from said input voltage comparator output terminal.

2. A high power factor circuit having an input terminal and an output terminal, said high power factor circuit comprising:

a multiplier circuit having a first input terminal in electrical communication with said high power factor circuit input terminal, a second input terminal, a control terminal and an output terminal for providing a signal to control an output voltage at said high power factor circuit output terminal, said multiplier circuit comprising:

a multiplier having a first input terminal, a second input terminal, and an output terminal, wherein said multiplier first input terminal is said first input terminal of said multiplier circuit and said multiplier output terminal is said output terminal of said multiplier circuit;

a gain amplifier having an input terminal and an output terminal, wherein said gain amplifier output terminal is in electrical communication with said multiplier second input terminal and wherein said gain amplifier input terminal is said second input terminal of said multiplier circuit; and a switch having a first terminal in electrical communication with said gain amplifier input terminal, a second terminal in electrical communication with said gain amplifier output terminal and a control terminal, wherein said switch control terminal is said control terminal of said multiplier circuit, said switch switchably connecting said switch first terminal to said switch second terminal in response to a signal applied to said switch control terminal;

an output voltage amplifier having a first input terminal in electrical communication with said high power factor circuit output terminal, a second input terminal in communication with an output reference voltage and an output terminal in electrical communication with said multiplier circuit second input terminal, said output voltage amplifier providing a signal at said output voltage amplifier output terminal in response to comparing said output voltage at said high power factor circuit output terminal with said output reference voltage;

an input voltage comparator having a first input terminal in electrical communication with said high power factor circuit input terminal, a second input terminal in communication with an input reference voltage and an output terminal in electrical communication with said multiplier circuit control terminal, said input voltage comparator providing a signal at said input voltage comparator output terminal in response to comparing an input voltage at said high power factor circuit input terminal with said input reference voltage, said multiplier circuit providing a preselected gain in response to said signal applied to said multiplier circuit control terminal from said input voltage comparator output terminal.

3. A high power factor circuit having an input terminal and an output terminal, said high power factor circuit comprising:

a multiplier circuit having a first input terminal in electrical communication with said high power factor circuit input terminal, a second input terminal, a control terminal and an output terminal for providing a signal to control an output voltage at said high power factor circuit output terminal, said multiplier circuit comprising;

a multiplier having a first input terminal, a second input terminal, and an output terminal, wherein said multiplier first input terminal is said first input terminal of said multiplier circuit and said multiplier second input terminal is said multiplier circuit second input terminal;

a gain amplifier having an input terminal and an output terminal, said gain amplifier input terminal in electrical communication with said multiplier output terminal and wherein said gain amplifier output terminal is said output terminal of said multiplier circuit; and a switch having a first terminal in electrical communication with said gain amplifier input terminal, a second terminal in electrical communication with said gain amplifier output terminal and a control terminal, wherein said switch control terminal is said control terminal of said multiplier circuit, said switch switchably connecting said switch first terminal to said switch second terminal in response to a signal applied to said switch control terminal;

an output voltage amplifier having a first input terminal in electrical communication with said high power factor circuit output terminal, a second input terminal in communication with an output reference voltage and an output terminal in electrical communication with said multiplier circuit second input terminal, said output voltage amplifier providing a signal at said output voltage amplifier output terminal in response to comparing said output voltage at said high power factor circuit output terminal with said output reference voltage;

an input voltage comparator having a first input terminal in electrical communication with said high power factor circuit input terminal, a second input terminal in communication with an input reference voltage and an output terminal in electrical communication with said multiplier circuit control terminal, said input voltage comparator providing a signal at said input voltage comparator output terminal in response to comparing an input voltage at said high power factor circuit input terminal with said input reference voltage, said multiplier circuit providing a preselected gain in response to said signal applied to said multiplier circuit control terminal from said input voltage comparator output terminal.

4. A high power factor circuit having an input terminal and an output terminal, said high power factor circuit comprising:

- a multiplier circuit having a first input terminal in electrical communication with said high power factor circuit input terminal, a second input terminal, a control terminal and an output terminal for providing a signal to control an output voltage at said high power factor circuit output terminal, said multiplier circuit comprising;
- a multiplier having a first input terminal, a second input terminal, and an output terminal, wherein said multiplier second input terminal is said second input terminal of said multiplier circuit and said multiplier output terminal is said output terminal of said multiplier circuit;
- a gain amplifier having an input terminal and an output terminal, said gain amplifier output terminal in electrical communication with said multiplier first input terminal and wherein said amplifier input terminal is said first input terminal of said multiplier circuit; and
- a switch having a first terminal in electrical communication with said gain amplifier input terminal, a second terminal in electrical communication with said gain amplifier output terminal and a control terminal, wherein said switch control terminal is said control terminal of said multiplier circuit,
- said switch connecting said switch first terminal to said switch second terminal in response to a signal applied to said switch control terminal;
- an output voltage amplifier having a first input terminal in electrical communication with said high power factor circuit output terminal, a second input terminal in communication with an output reference voltage and an output terminal in electrical communication with said multiplier circuit second input terminal, said output voltage amplifier providing a signal at said output voltage amplifier output terminal in response to comparing said output voltage at said high power factor circuit output terminal with said output reference voltage;
- an input voltage comparator having a first input terminal in electrical communication with said high power factor circuit input terminal, a second input terminal in communication with an input reference voltage and an output terminal in electrical communication with said multiplier circuit control terminal, said input voltage comparator providing a signal at said input voltage comparator output terminal in response to comparing an input voltage at said high power factor circuit input terminal with said input reference voltage,
- said multiplier circuit providing a preselected gain in response to said signal applied to said multiplier circuit control terminal from said input voltage comparator output terminal.

5. A high power factor circuit comprising:

- a first input-voltage terminal and a second input-voltage terminal for connection to a rectified AC line supply;
- an output-voltage terminal;
- a pulse width modulator comprising a pulse width modulator output terminal and a pulse width modulator input terminal;
- a boost converter comprising a first boost converter terminal in electrical communication with said first input-voltage terminal, a second boost converter terminal in electrical communication with said first output-voltage terminal, a third boost converter terminal in switchable electrical communication with said second input-voltage terminal, and a fourth boost converter terminal in electrical communication with said pulse width modulator output terminal, said third boost converter terminal being switchable in response to signals applied to said fourth boost converter terminal from said pulse width modulator output terminal;
- an output voltage sensing circuit comprising a first output-voltage sensing terminal and a second output-voltage sensing terminal, said first output-voltage sensing terminal in electrical communication with said output voltage terminal;
- an input-voltage sensing circuit comprising a first input-voltage sensing terminal and a second input-voltage sensing terminal, said first input-voltage sensing terminal in electrical communication with said first input-voltage terminal;
- a current sensing circuit in electrical communication with said second input-voltage terminal, said current sensing circuit comprising a current sensing circuit output terminal and producing a current signal in response to current flowing in said high power factor circuit;
- a current amplifier comprising a first current amplifier input terminal, a second current amplifier input terminal, and a current amplifier output terminal, said first current amplifier input terminal in electrical communication with said current sensing circuit output terminal and said current amplifier output terminal in electrical communication with said pulse width modulator input terminal;
- a multiplier comprising a first multiplier input terminal in electrical communication with said second input voltage sensing terminal, a second multiplier input terminal and a multiplier output terminal in electrical communication with said second current amplifier input terminal;
- an input-voltage comparator circuit comprising a first input-voltage comparator circuit input terminal in electrical communication with a threshold reference voltage, a second input-voltage comparator circuit input terminal in electrical communication with said first input-voltage terminal and an input-voltage comparator circuit output terminal;
- an output-voltage amplifier comprising a first output-voltage amplifier input terminal in electrical communication with an output reference voltage, a second output-voltage amplifier input terminal in electrical communication with said second output-voltage sensing terminal, and an output-voltage amplifier output terminal;
- a gain amplifier circuit comprising a gain amplifier circuit input terminal in electrical communication with said output-voltage amplifier output terminal, and a gain amplifier circuit output terminal in electrical communication with said second multiplier input terminal; and
- a switch circuit comprising a switch circuit input terminal in electrical communication with said gain amplifier circuit input terminal, a switch circuit output terminal in electrical communication with said gain amplifier circuit output terminal and a switch control terminal in electrical communication with said input-voltage comparator circuit output terminal, wherein said switch circuit connects said switch circuit input terminal to said switch circuit output terminal in response to a signal applied to said switch circuit control terminal from said input voltage comparator output terminal.

6. The high power factor circuit of claim 5 wherein
said input-voltage comparator circuit comprises a plurality of input-voltage comparators each of said input-voltage comparators having a first input-voltage comparator input terminal in electrical communication a respective reference voltage, a second input-voltage comparator input terminal in electrical communication with said first input-voltage terminal, and an input-voltage comparator output terminal;

said gain amplifier circuit comprises a plurality of serially coupled gain amplifiers, each gain amplifier comprising a gain amplifier input terminal and a gain amplifier output terminal, a first one of said plurality of gain amplifiers having an input terminal in electrical communication with the input terminal of said gain amplifier circuit, a second one of said plurality of gain amplifiers having an output terminal in electrical communication with said output terminal of said gain amplifier circuit; and said switch circuit comprises a plurality of switches, each of said switches comprising a switch input terminal in electrical communication with a respective one of said gain amplifier input terminals, a switch output terminal in electrical communication with a respective one of said gain amplifier output terminals and a switch control terminal in electrical communication with a respective one of said input-voltage comparator output terminals, wherein each said switch connects said respective switch input terminal to said respective switch output terminal in response to a signal applied to said respective switch control terminal from said respective input voltage comparator output terminal.

7. A high power factor circuit comprising:
a first input-voltage terminal and a second input-voltage terminal for connection to a rectified AC line supply;
an output-voltage terminal;
a pulse width modulator comprising a pulse width modulator output terminal and a pulse width modulator input terminal;
a boost converter comprising a first boost converter terminal in electrical communication with said first input-voltage terminal, a second boost converter terminal in electrical communication with said output-voltage terminal, a third boost converter terminal in switchable electrical communication with said second input-voltage terminal, and a fourth boost converter terminal in electrical communication with said pulse width modulator output terminal, said third boost converter terminal being switchable in response to signals applied to said fourth boost converter terminal from said pulse width modulator output terminal;
an output voltage sensing circuit comprising a first output-voltage sensing terminal and a second output-voltage sensing terminal, said first output-voltage sensing terminal in electrical communication with said output voltage terminal;
an input-voltage sensing circuit comprising a first input-voltage sensing terminal and a second input-voltage sensing terminal, said first input-voltage sensing terminal in electrical communication with said first input-voltage terminal;
a current sensing circuit in electrical communication with said second input-voltage terminal, said current sensing circuit comprising a current sensing circuit output terminal and producing a current signal in response to current flowing in said high power factor circuit;
a current amplifier comprising a first current amplifier input terminal, a second current amplifier input terminal, and a current amplifier output terminal, said first current amplifier input terminal in electrical communication with said current sensing circuit output terminal and said current amplifier output terminal in electrical communication with said pulse width modulator input terminal;
a multiplier comprising a first multiplier input terminal in electrical communication with said second input voltage sensing terminal, a second multiplier input terminal and a multiplier output terminal;
an input-voltage comparator comprising a first input-voltage comparator input terminal in electrical communication with a threshold reference voltage, a second input-voltage comparator input terminal in electrical communication with said first input-voltage terminal and an input-voltage comparator output terminal;
an output-voltage amplifier comprising a first output-voltage amplifier input terminal in electrical communication with an output reference voltage, a second output-voltage amplifier input terminal in electrical communication with said second output-voltage sensing terminal, and an output-voltage amplifier output terminal in electrical communication with said second multiplier input terminal;
a gain amplifier comprising a gain amplifier input terminal in electrical communication with said multiplier output terminal and a gain amplifier output terminal in electrical communication with said second current amplifier input terminal; and
a switch comprising a switch input terminal in electrical communication with said gain amplifier input terminal, a switch output terminal in electrical communication with said gain amplifier output terminal and a switch control terminal in electrical communication with said input-voltage comparator output terminal,
wherein said switch connects said switch input terminal to said switch output terminal in response to a signal applied to said switch control terminal from said input voltage comparator output terminal.

8. The high power factor circuit of claim 7 wherein
said input-voltage comparator circuit comprises a plurality of input-voltage comparators each of said input-voltage comparators having a first input-voltage comparator input terminal in electrical communication a respective reference voltage, a second input-voltage comparator input terminal in electrical communication with said first input-voltage terminal, and an input-voltage comparator output terminal;
said gain amplifier circuit comprises a plurality of serially coupled gain amplifiers, each gain amplifier comprising a gain amplifier input terminal and a gain amplifier output terminal, a first one of said plurality of gain amplifiers having an input terminal in electrical communication with the input terminal of said gain amplifier circuit, a second one of said plurality of gain amplifiers having an output terminal in electrical communication with said output terminal of said gain amplifier circuit; and said switch circuit comprises a plurality of switches, each of said switches comprising a switch input terminal in electrical communication with a respective one of said gain amplifier input terminals, a switch output terminal in electrical communication with a respective one of said gain amplifier output terminals and a switch control terminal in electrical communication with a respective one of said input-voltage comparator output terminals, wherein each said switch connects said respective switch input terminal to said respective switch output terminal in response to a signal applied to said respective switch control terminal from said respective input voltage comparator output terminal.

9. A high power factor circuit comprising:

a first input-voltage terminal and a second input-voltage terminal for connection to a rectified AC line supply;

an output-voltage terminal;

a pulse width modulator comprising a pulse width modulator output terminal and a pulse width modulator input terminal;

a boost converter comprising a first boost converter terminal in electrical communication with said first input-voltage terminal, a second boost converter terminal in electrical communication with said output-voltage terminal, a third boost converter terminal in switchable electrical communication with said second input-voltage terminal, and a fourth boost converter terminal in electrical communication with said pulse width modulator output terminal, said third boost converter terminal being switchable in response to signals applied to said fourth boost converter terminal from said pulse width modulator output terminal;

an output voltage sensing circuit comprising a first output-voltage sensing terminal and a second output-voltage sensing terminal, said first output-voltage sensing terminal in electrical communication with said output-voltage terminal;

an input-voltage sensing circuit comprising a first input-voltage sensing terminal and a second input-voltage sensing terminal, said first input-voltage sensing terminal in electrical communication with said first input-voltage terminal;

a current sensing circuit in electrical communication with said second input-voltage terminal, said current sensing circuit comprising a current sensing circuit output terminal and producing a current signal in response to current flowing in said high power factor circuit;

a current amplifier comprising a first current amplifier input terminal, a second current amplifier input terminal, and a current amplifier output terminal, said first current amplifier input terminal in electrical communication with said current sensing circuit output terminal and said current amplifier output terminal in electrical communication with said pulse width modulator input terminal;

a multiplier comprising a first multiplier input terminal, a second multiplier input terminal and a multiplier output terminal in electrical communication with said second current amplifier input terminal;

an input-voltage comparator comprising a first input-voltage comparator input terminal in electrical communication with a threshold reference voltage, a second input-voltage comparator input terminal in electrical communication with said first input-voltage terminal and an input-voltage comparator output terminal;

an output-voltage amplifier comprising a first output-voltage amplifier input terminal in electrical communication with an output reference voltage, a second output-voltage amplifier input terminal in electrical communication with said second output-voltage sensing terminal, and an output-voltage amplifier output terminal in electrical communication with said second multiplier input terminal;

a gain amplifier comprising an input terminal in electrical communication with said second input-voltage sense terminal and an output terminal in electrical communication with said first multiplier input terminal; and a switch comprising a switch input terminal in electrical communication with said gain amplifier input terminal, a switch output terminal in electrical communication with said gain amplifier output terminal and a switch control terminal in electrical communication with said input-voltage comparator output terminal, wherein said switch connects said switch input terminal to said switch output terminal in response to a signal applied to said switch control terminal from said input voltage comparator output terminal.

10. The high power factor circuit of claim 9 wherein said input-voltage comparator circuit comprises a plurality of input-voltage comparators each of said input-voltage comparators having a first input-voltage comparator input terminal in electrical communication a respective reference voltage, a second input-voltage comparator input terminal in electrical communication with said first input-voltage terminal, and an input-voltage comparator output terminal;

said gain amplifier circuit comprises a plurality of serially coupled gain amplifiers, each gain amplifier comprising a gain amplifier input terminal and a gain amplifier output terminal, a first one of said plurality of gain amplifiers having an input terminal in electrical communication with the input terminal of said gain amplifier circuit, a second one of said plurality of gain amplifiers having an output terminal in electrical communication with said output terminal of said gain amplifier circuit; and said switch circuit comprises a plurality of switches, each of said switches comprising a switch input terminal in electrical communication with a respective one of said gain amplifier input terminals, a switch output terminal in electrical communication with a respective one of said gain amplifier output terminals and a switch control terminal in electrical communication with a respective one of said input-voltage comparator output terminals, wherein each said switch connects said respective switch input terminal to said respective switch output terminal in response to a signal applied to said respective switch control terminal from said respective input voltage comparator output terminal.

* * * * *